(12) United States Patent
Seiders et al.

(10) Patent No.: US 12,593,752 B2
(45) Date of Patent: Apr. 7, 2026

(54) SYSTEM AND METHOD FOR CONTROLLING HARVESTING IMPLEMENT OPERATION OF AN AGRICULTURAL HARVESTER BASED ON TILT ACTUATOR FORCE

(71) Applicant: CNH Industrial America LLC, New Holland, PA (US)

(72) Inventors: Kenneth Seiders, Elizabethtown, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 207 days.

(21) Appl. No.: 17/922,257

(22) PCT Filed: Apr. 29, 2021

(86) PCT No.: PCT/US2021/029928

§ 371 (c)(1),
(2) Date: Oct. 28, 2022

(87) PCT Pub. No.: WO2021/222592

PCT Pub. Date: Nov. 4, 2021

(65) Prior Publication Data

US 2023/0172107 A1      Jun. 8, 2023

Related U.S. Application Data

(60) Provisional application No. 63/017,247, filed on Apr. 29, 2020.

(51) Int. Cl.
A01D 41/14        (2006.01)
A01D 41/127      (2006.01)

(52) U.S. Cl.
CPC ....... A01D 41/141 (2013.01); A01D 41/1274 (2013.01)

(58) Field of Classification Search
CPC .................................................. A01D 41/141
See application file for complete search history.

(56) References Cited

U.S. PATENT DOCUMENTS

| | | | |
|---|---|---|---|
| 4,776,153 A | 10/1988 | DePauw et al. | |
| 5,341,628 A | 8/1994 | Schumacher, II et al. | |
| | | (Continued) | |

FOREIGN PATENT DOCUMENTS

| | | | | |
|---|---|---|---|---|
| EP | 3348132 A1 | 7/2018 | | |
| EP | 4091418 A1 * | 11/2022 | ......... | A01D 41/1274 |
| | | (Continued) | | |

OTHER PUBLICATIONS

Google Machine Translation of EP3348132B1 (2017) (Year: 2017).*
International Search Report and Written Opinion for PCT Application No. PCT/US2021/029928 dated Aug. 6, 2021 (16 pages).

*Primary Examiner* — Jean Paul Cass
(74) *Attorney, Agent, or Firm* — Dority & Manning, P.A.

(57)        ABSTRACT

A system for controlling harvesting implement operation of an agricultural harvester includes a fluid-driven actuator configured to adjust a position of a harvesting implement of the agricultural harvester relative to a feeder housing of the agricultural harvester. Additionally, the system includes a sensor provided in operative association with the fluid-driven actuator, with the sensor configured to capture data indicative of a parameter associated with a force acting on the fluid-driven actuator. Furthermore, the system includes a computing system configured to monitor the parameter relative to a predetermined minimum parameter value. Moreover, when the monitored parameter falls below the predetermined minimum parameter value, the computing system is configured to determine that the harvesting implement has contacted a field surface of a field across which the agricultural harvester is traveling.

13 Claims, 4 Drawing Sheets

(56) References Cited

U.S. PATENT DOCUMENTS

| | | | |
|---|---|---|---|
| 5,359,836 A | 11/1994 | Zeuner et al. | |
| 5,704,200 A | 1/1998 | Chmielewski, Jr. et al. | |
| 5,918,448 A | 7/1999 | Wheeler | |
| 8,079,204 B2 | 12/2011 | Coers et al. | |
| 9,232,687 B2 * | 1/2016 | Bassett | A01C 7/203 |
| 11,497,164 B2 * | 11/2022 | Martin | A01B 63/002 |
| 2017/0013778 A1 | 1/2017 | Borry et al. | |
| 2018/0070531 A1 * | 3/2018 | Long | A01D 34/006 |
| 2018/0255706 A1 * | 9/2018 | Smith | A01D 41/14 |
| 2019/0082598 A1 | 3/2019 | Seiders, Jr. | |
| 2019/0230855 A1 * | 8/2019 | Reed | A01B 69/004 |
| 2019/0230857 A1 * | 8/2019 | Thomson | A01D 41/141 |
| 2020/0077584 A1 * | 3/2020 | Miller | A01D 41/145 |
| 2021/0289703 A1 * | 9/2021 | Hunt | A01D 41/145 |
| 2021/0315145 A1 * | 10/2021 | Bassett | A01B 63/008 |
| 2022/0071089 A1 * | 3/2022 | Brimeyer | F15B 1/26 |
| 2023/0389469 A1 * | 12/2023 | Hunt | A01D 41/141 |
| 2023/0413709 A1 * | 12/2023 | Honey | A01B 63/22 |
| 2024/0000014 A1 * | 1/2024 | Hunt | A01D 41/141 |
| 2024/0032467 A1 * | 2/2024 | Deichmann | A01D 41/141 |
| 2024/0032468 A1 * | 2/2024 | Todderud | A01D 41/127 |
| 2024/0040966 A1 * | 2/2024 | Cook | A01D 41/144 |

FOREIGN PATENT DOCUMENTS

| | | | | |
|---|---|---|---|---|
| WO | WO-2021222592 A1 * | 11/2021 | | A01D 41/1274 |
| WO | WO-2022046769 A1 * | 3/2022 | | A01D 34/006 |

* cited by examiner

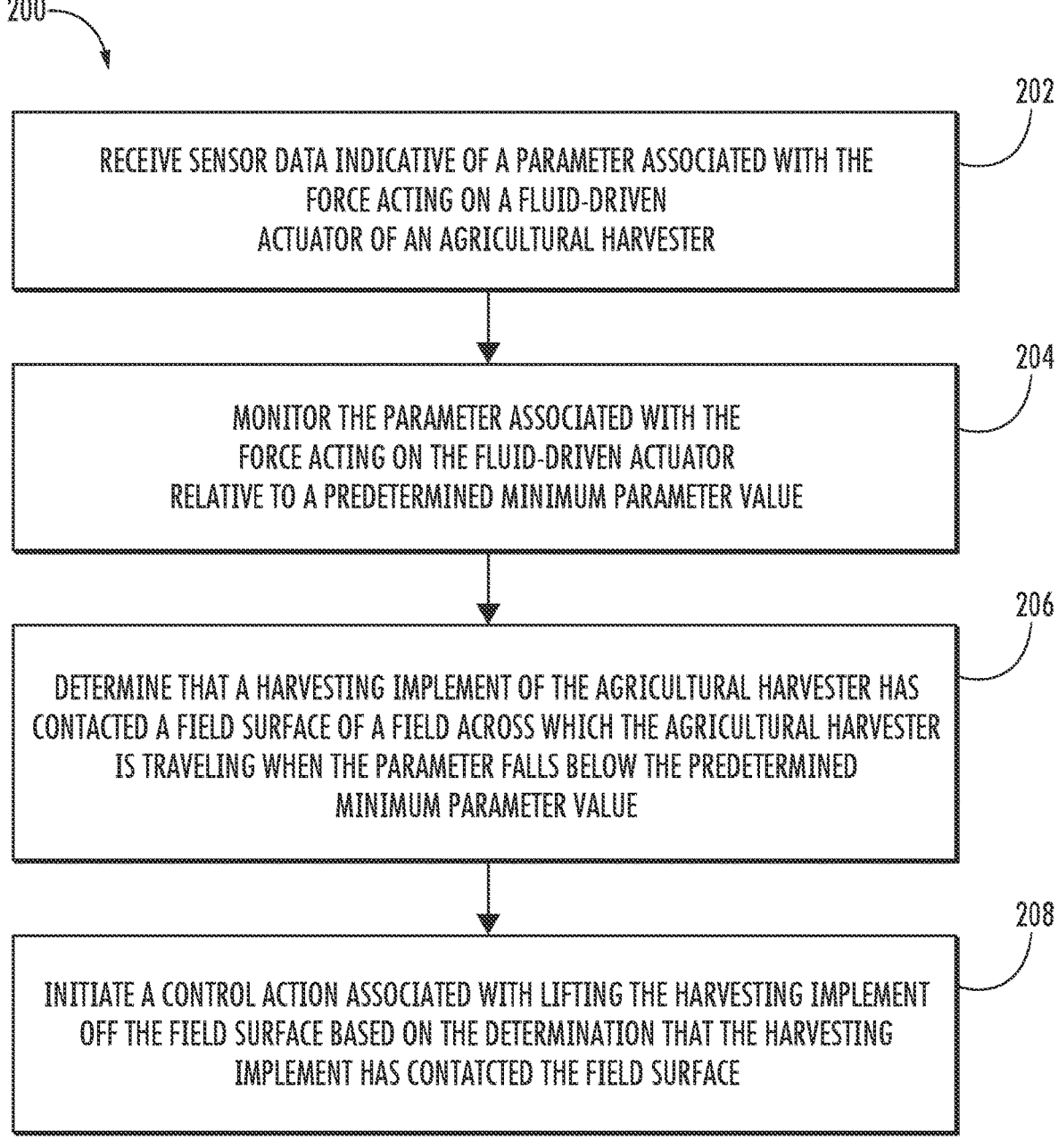

200

202

RECEIVE SENSOR DATA INDICATIVE OF A PARAMETER ASSOCIATED WITH THE
FORCE ACTING ON A FLUID-DRIVEN
ACTUATOR OF AN AGRICULTURAL HARVESTER

204

MONITOR THE PARAMETER ASSOCIATED WITH THE
FORCE ACTING ON THE FLUID-DRIVEN ACTUATOR
RELATIVE TO A PREDETERMINED MINIMUM PARAMETER VALUE

206

DETERMINE THAT A HARVESTING IMPLEMENT OF THE AGRICULTURAL HARVESTER HAS
CONTACTED A FIELD SURFACE OF A FIELD ACROSS WHICH THE AGRICULTURAL HARVESTER
IS TRAVELING WHEN THE PARAMETER FALLS BELOW THE PREDETERMINED
MINIMUM PARAMETER VALUE

208

INITIATE A CONTROL ACTION ASSOCIATED WITH LIFTING THE HARVESTING IMPLEMENT
OFF THE FIELD SURFACE BASED ON THE DETERMINATION THAT THE HARVESTING
IMPLEMENT HAS CONTATCTED THE FIELD SURFACE

FIG. 4

SYSTEM AND METHOD FOR CONTROLLING HARVESTING IMPLEMENT OPERATION OF AN AGRICULTURAL HARVESTER BASED ON TILT ACTUATOR FORCE

FIELD OF THE INVENTION

The present disclosure generally relates to agricultural harvesters and, more particularly, to systems and methods for controlling the operation of a harvesting implement of an agricultural harvester based on the force associated with one or more tilt actuators of the harvester.

BACKGROUND OF THE INVENTION

A harvester is an agricultural machine used to harvest and process crops. For instance, a combine harvester may be used to harvest grain crops, such as wheat, oats, rye, barley, corn, soybeans, and flax or linseed. In general, the objective is to complete several processes, which traditionally were distinct, in one pass of the machine over a portion of the field. In this respect, most harvesters are equipped with a header or harvesting implement, which cuts and collects the crop from the field. The harvester also includes a crop processing system, which performs various processing operations (e.g., threshing, separating, etc.) on the harvested crop received from the header. Furthermore, the harvester includes a crop tank, which receives and stores the harvested crop after processing.

When performing a harvesting operation, the header is positioned at a predetermined height above the field surface. Such positioning, in turn, permits a cutter bar mounted on the header to sever the crops present within the field from the associated stubble at a desired cutting height. As the harvester travels across the field to perform the harvesting operation, the contour or topography of the field may vary. In this respect, many current combines use an automatic header height control system that attempts to maintain a generally constant cutting height above the field surface regardless of the field contour or field position relative to the base combine. While such systems work well, improvements are needed.

Accordingly, an improved system and method for controlling harvesting implement operation of an agricultural harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling harvesting implement operation of an agricultural harvester. The system includes a fluid-driven actuator configured to adjust a position of a harvesting implement of the agricultural harvester relative to a feeder housing of the agricultural harvester. Additionally, the system includes a sensor provided in operative association with the fluid-driven actuator, with the sensor configured to capture data indicative of a parameter associated with a force acting on the fluid-driven actuator. Furthermore, the system includes a computing system communicatively coupled to the sensor. The computing system is, in turn, configured to monitor the parameter associated with the force acting on the fluid-driven actuator relative to a predetermined minimum parameter value. Moreover, when the monitored parameter falls below the predetermined minimum parameter value, the computing system is configured to determine that the harvesting implement has contacted a field surface of a field across which the agricultural harvester is traveling.

In another aspect, the present subject matter is directed to an agricultural harvester including a chassis, a feeder housing pivotably coupled to the chassis, and a fluid-driven lift actuator coupled between the feeder housing and the chassis. The fluid-driven lift actuator is, in turn, configured to pivot the feeder housing relative to the chassis. Additionally, the agricultural harvester includes a feeder face plate adjustably coupled to the feeder housing and a fluid-driven tilt actuator coupled between the feeder face plate and the feeder housing. The fluid-driven tilt actuator is, in turn, configured to pivot the feeder face plate relative to the feeder housing. Furthermore, the agricultural harvester includes a sensor provided in operation association with the fluid-driven tilt actuator, with the sensor configured to capture data indicative of a parameter associated with a force acting on the fluid-driven tilt actuator. Moreover, the agricultural harvester includes a computing system communicatively coupled to the sensor. The computing system is, in turn, configured to monitor the parameter associated with the force acting on the fluid-driven tilt actuator relative to a predetermined minimum parameter value. In addition, when the monitored parameter falls below the predetermined minimum parameter value, the computing system is configured to determine that a harvesting implement of the agricultural harvester has contacted a field surface of a field across which the agricultural harvester is traveling.

In a further aspect, the present subject matter is directed to a method for controlling harvesting implement operation of an agricultural harvester. The agricultural harvester, in turn, includes a fluid-driven actuator configured to adjust a position of a harvesting implement of the agricultural harvester relative to a feeder housing of the agricultural harvester. The method includes receiving, with a computing system including one or more computing devices, sensor data indicative of a parameter associated with a force acting on the fluid-driven actuator. Additionally, the method includes monitoring, with the computing system, the parameter associated with the force acting on the fluid-driven actuator relative to a predetermined minimum parameter value. Furthermore, the method includes determining, with the computing system, that the harvesting implement has contacted a field surface of a field across which the agricultural harvester is traveling when the parameter falls below the predetermined minimum parameter value. Moreover, the method includes initiating, with the computing system, a control action associated with lifting the harvesting implement off the field surface based on the determination that the harvesting implement has contacted the field surface.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which:

FIG. 4 illustrates a flow diagram of one embodiment of a method for controlling harvesting implement operation of an agricultural harvester in accordance with aspects of the present subject matter.

Figure 1:
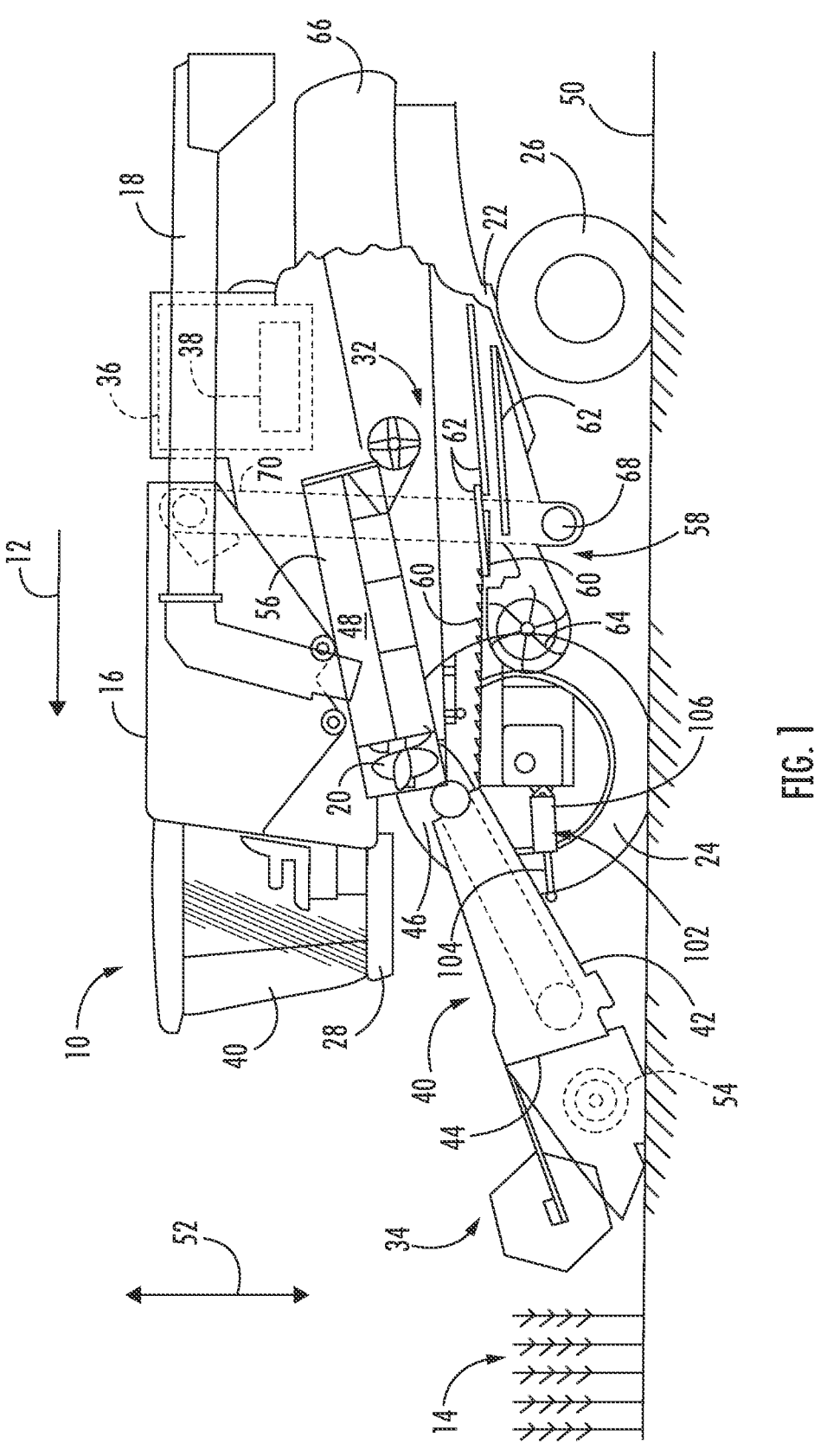
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for controlling harvesting implement operation of an agricultural harvester. Specifically, in several embodiments, the agricultural harvester may include a chassis, a feeder housing pivotably coupled the chassis, and a feeder face plate pivotably coupled to the feeder housing. Moreover, the feeder face plate may be configured to be coupled to a header or harvesting implement of the harvester. Furthermore, the harvester may include one or more fluid-driven lift actuators coupled between the feeder housing and the chassis. In this respect, the lift actuator(s) may be configured to pivot the feeder housing relative to the chassis such that the header is raised and lowered relative to the field surface. Additionally, the harvester may include one or more fluid-driven tilt actuators coupled between the feeder face plate and the feeder housing. As such, the tilt actuator(s) may be configured to pivot the feeder face plate relative to the feeder housing, thereby adjusting the tilt angle or orientation of the header relative to the field surface.

In accordance with aspects of the present subject matter, a computing system of the disclosed system may be configured to determine when header has contacted the field surface during a harvesting operation. More specifically, as the harvester travels across the field to perform a harvesting operation, the computing system may be configured to receive sensor data indicative of a parameter associated with the force acting on the tilt actuator(s). For example, in several embodiments, the parameter may correspond to the pressure of the fluid within the tilt actuator(s). In this respect, the computing system may be configured to monitor the parameter associated with the force acting on the fluid-driven actuator relative to a predetermined minimum parameter value. Furthermore, the computing system may be configured to determine that the header has contacted the field surface when the monitored parameter falls below the predetermined minimum parameter value. Thereafter, when it is determined that the header has contacted the field surface, the computing system may be configured to initiate one or more control actions. For example, such control action(s) may include controlling the operation of the tilt actuator(s) and/or the lift actuator(s) to lift the header off the field surface.

Referring now to the drawings, FIG. 1 illustrates a partial sectional side view of the agricultural harvester 10. In general, the harvester 10 may be configured to travel across a field in a forward direction of travel (indicated by arrow 12) to harvest a crop 14. While traversing the field, the harvester 10 may be configured to process and store the harvested crop within a crop tank 16 of the harvester 10. Furthermore, the harvested crop may be unloaded from the crop tank 16 for receipt by the crop receiving vehicle (not shown) via a crop discharge tube 18 of the harvester 10. Moreover, as shown, in the illustrated embodiment, the harvester 10 is configured as an axial-flow type combine in which the harvested crop is threshed and separated while being advanced by and along a longitudinally arranged rotor 20. However, in alternative embodiments, the harvester 10 may have any other suitable harvester configuration, such as a traverse-flow type configuration.

The harvester 10 may include a chassis or main frame 22 configured to support and/or couple to various components of the harvester 10. For example, in several embodiments, the harvester 10 may include a pair of driven, front wheels 24 and a pair of steerable, rear wheels 26 coupled to the frame 22. As such, the wheels 24, 26 may be configured to support the harvester 10 relative to the ground and move the harvester 10 in the forward direction of travel 12. Furthermore, the harvester 10 may include an operator's platform 28 having an operator's cab 30, a crop processing system 32, the crop tank 16, and the crop discharge tube 18 supported by the frame 22. As will be described below, the crop processing system 32 may be configured to perform various processing operations on the harvested crop as the crop processing system 32 transfers the harvested crop between a harvesting implement of the harvester 10, such as a header 34, and the crop tank 16. Furthermore, the harvester 10 may include an engine 36 and a transmission 38 mounted on the frame 22. The transmission 38 may be operably coupled to the engine 36 and may provide variably adjusted gear ratios for transferring engine power to the wheels 24 via a drive axle assembly (or via axles if multiple drive axles are employed).

Furthermore, as shown in FIG. 1, the harvester 10 includes a feeder 40 that couples to and supports the header 34. More specifically, the feeder 40 may include a feeder housing 42 extending from the forward end 44 to an aft end 46. As will be described below, the forward end 44 of the feeder housing 42 may, in turn, be coupled to header 34. Moreover, the aft end 46 of the feeder housing 42 may be pivotably coupled to the chassis 22 adjacent to a threshing and separating assembly 48 of the crop processing system 32. Such a pivotable coupling may permit movement of the header 34 relative to a field surface 50 in a vertical direction (indicated by arrow 52). For example, in several embodiments, one or more fluid-driven lift actuators 102 (e.g., a hydraulic or pneumatic actuator(s)) may be coupled between the chassis 22 and the feeder housing 42. In such embodiments, a rod(s) 104 of the lift actuator(s) 102 may be extended relative to an associated cylinder(s) 106 of the lift actuator(s) 102 to pivot the forward end 44 of the feeder housing 42 upward in the vertical direction 52, thereby raising the header 34 relative to the field surface 50. Similarly, the rod(s) 104 of the lift actuator(s) 102 may be retracted relative to the associated cylinder(s) 106 of the lift actuator(s) 102 to pivot the forward end 44 of the feeder housing 42 downward in the vertical direction 52, thereby lowering the header 34 relative to the field surface 50. As such, the operation of the lift cylinder(s) 102 may be controlled to move the header 34 upward and downward in the vertical direction 52 relative to a field surface 50 to maintain a generally constant cutting height (e.g., as indicated by arrow 53 in FIG. 2) above the field surface 50 as the contour of the field surface 50 changes.

As the harvester 10 is propelled in the forward direction of travel 12 over the field with the crop 14, the crop material is severed from the stubble by one or more knives (not shown) at the front of the header 34 and delivered by a header auger 54 to the forward end 44 of the feeder housing 42, which supplies the harvested crop to the threshing and separating assembly 46. In general, the threshing and separating assembly 46 may include a cylindrical chamber 56 in which the rotor 20 is rotated to thresh and separate the harvested crop received therein. That is, the harvested crop is rubbed and beaten between the rotor 20 and the inner surfaces of the chamber 56 to loosen and separate the grain, seed, or the like from the straw.

The harvested crop separated by the threshing and separating assembly 46 may fall onto a crop cleaning assembly 58 of the crop processing system 34. In general, the crop cleaning assembly 58 may include a series of pans 60 and associated sieves 62. In general, the separated harvested crop may be spread out via the oscillation of pans 60 and/or sieves 62 and may eventually fall through apertures defined by the sieves 62. Additionally, a cleaning fan 64 may be positioned adjacent to one or more of the sieves 62 to provide an air flow through the sieves 62 that removes chaff and other impurities from the harvested crop. For instance, the fan 64 may blow the impurities off the harvested crop for discharge from the harvester 10 through the outlet of a straw hood 66 positioned at the back end of the harvester 10. The cleaned harvested crop passing through the sieves 62 may then fall into a trough of an auger 68, which may be configured to transfer the harvested crop to an elevator 70 for delivery to the crop tank 16.

Figure 2:
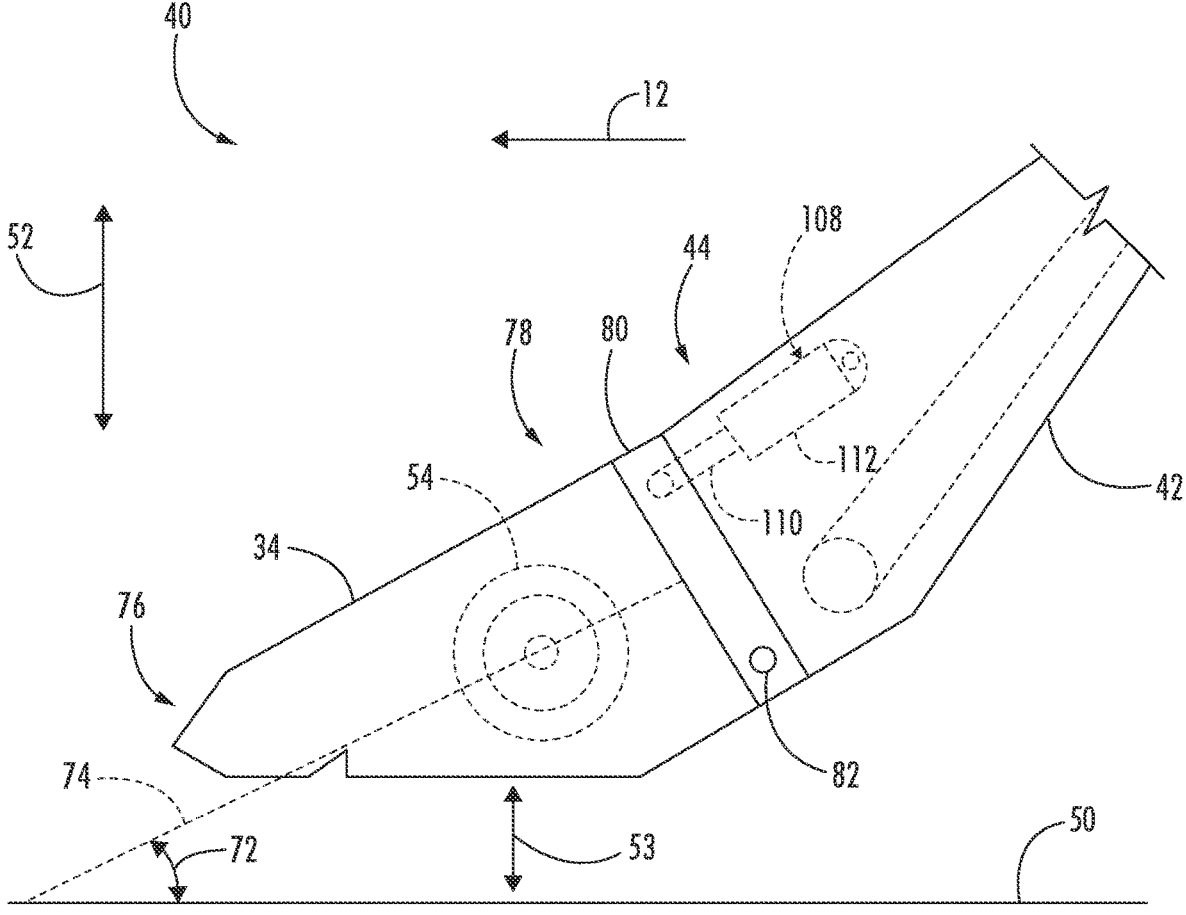
FIG. 2 illustrates a side view of one embodiment of a feeder of an agricultural harvester in accordance with aspects of the present subject matter.

Referring now to FIG. 2, a side view of one embodiment of a feeder 40 of the agricultural harvester 10 is illustrated. As mentioned above, the feeder 40 may include a feeder housing 42 having its forward end 44 coupled to the header 34. In several embodiments, the header 34 may be coupled to the feeder 40 to permit a fore/aft tilt angle (indicated by arrow 72) of the header 34 to be adjusted. The "fore/aft tilt angle" of the header 34, in turn, is the angle defined between a longitudinal axis 74 of the header 34 and the field surface 50, with the longitudinal axis 74 extending between a forward end 76 of the header 34 and an aft end 78 of the header 34. Specifically, in one embodiment, the feeder 40 may include a feeder face plate 80 pivotably coupled to the forward end 44 of the feeder housing 42 via a pivot joint 82. Moreover, the feeder face plate 80 may be coupled (e.g., bolted) to the header 34. However, in alternative embodiments, the header 34 may be pivotably coupled to the feeder 40 in any other suitable manner.

Additionally, in several embodiments, one or more fluid-driven tilt actuators 104 (e.g., a hydraulic or pneumatic actuator(s)) may be configured to adjust the fore/aft tilt angle 104 of the header 34. More specifically, the tilt actuator(s)

108 may be coupled between the feeder face plate 80 and the forward end 44 of the feeder housing 42. In such embodiments, a rod(s) 110 of the tilt actuator(s) 108 may be extended relative to an associated cylinder(s) 112 of the tilt actuator(s) 108 to pivot the feeder face plate 80 relative to the forward end 44 of the feeder housing 42. Such extension may, in turn, pivot the header 34 in a manner that lowers the forward end 76 of the header 34 relative to the field surface 50, thereby increasing the fore/aft tilt angle 72. Similarly, the rod(s) 110 of the tilt actuator(s) 108 may be retracted relative to the associated cylinder(s) 112 of the tilt actuator(s) 108 to pivot the feeder face plate 80 relative to the forward end 44 of the feeder housing 42. Such retraction may, in turn, pivot the header 34 in a manner that raises the forward end 76 of the header 34 relative to the field surface 50, thereby decreasing or flattening the fore/aft tilt angle 72. As such, the operation of the tilt cylinder(s) 108 may be controlled in addition to the lift actuator(s) 102 to maintain a generally constant cutting height 53 above the field surface 50 as the contour of the field surface 50 changes.

It should be further appreciated that the configuration of the agricultural harvester 10 described above and shown in FIGS. 1 and 2 is provided only to place the present subject matter in an exemplary field of use. Thus, it should be appreciated that the present subject matter may be readily adaptable to any manner of harvester configuration.

Figure 3:
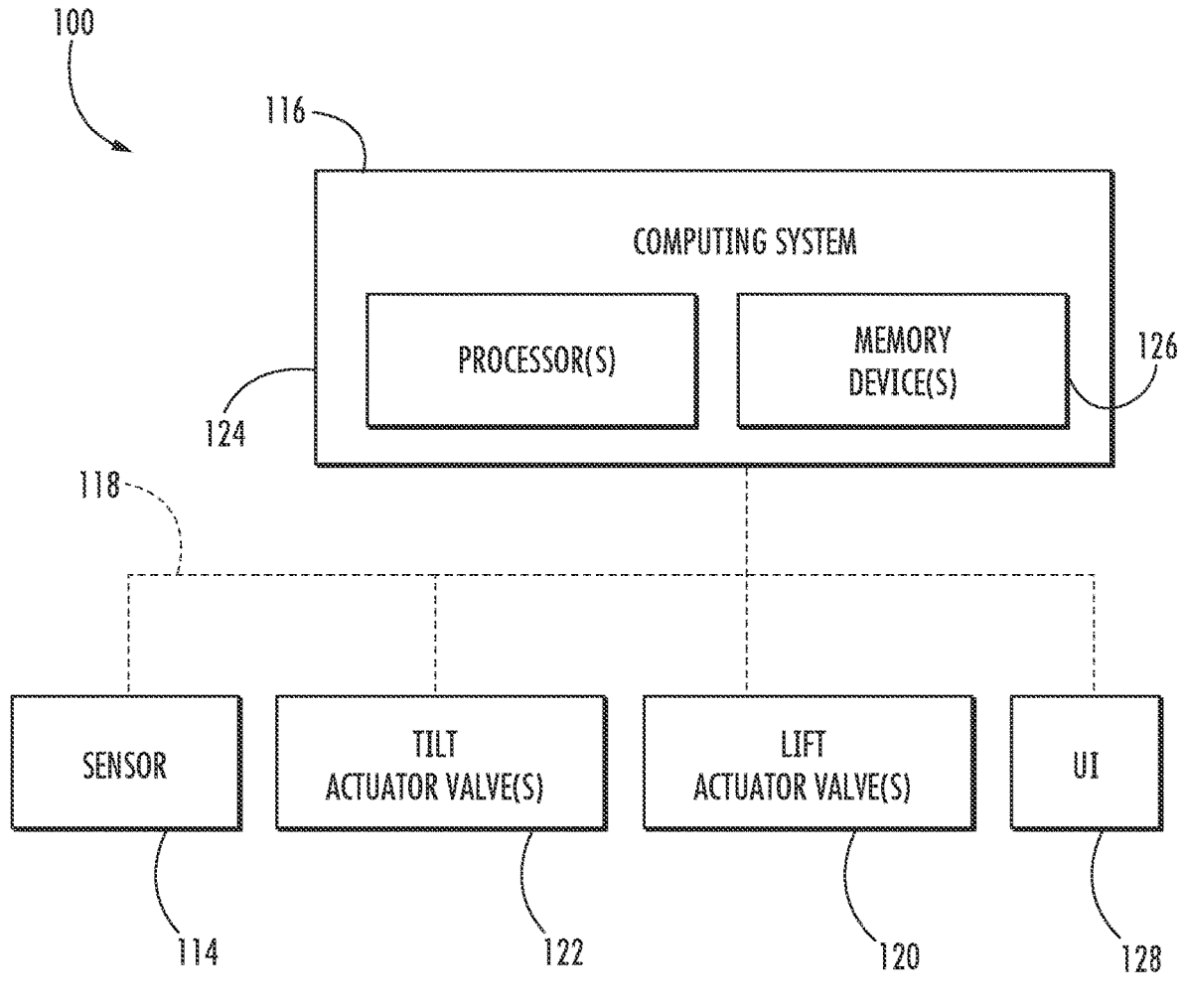
FIG. 3 illustrates a schematic view of one embodiment of a system for controlling harvesting implement operation of an agricultural harvester in accordance with aspects of the present subject matter.

Referring now to FIG. 3, a schematic view of one embodiment of a system 100 for controlling harvesting implement operation of an agricultural harvester is illustrated in accordance with aspects of the present subject matter. In general, the system 100 will be described herein with reference to the agricultural harvester 10 described above with reference to FIGS. 1 and 2. However, it should be appreciated by those of ordinary skill in the art that the disclosed system 100 may generally be utilized with agricultural harvesters having any other suitable harvester configuration.

As shown in FIG. 3, the system 100 may include a sensor 114 configured to capture data indicative of a parameter associated with the force acting on the tilt actuator(s) 108. As will be described below, such parameter may be monitored as the harvester 10 travels across the field to perform a harvesting operation and used to determine when the header 34 has contacted the field surface. Specifically, in several embodiments, the sensor 114 may be configured as a pressure sensor configured to capture data indicative of the pressure of the fluid within the tilt actuator(s) 108. In this respect, the sensor 114 may be coupled to a fluid conduit in fluid communication with the tilt actuator(s) 108, such as a load-bearing fluid chamber of one of the tilt actuator(s) 108. Thus, in such embodiments, the sensor 114 may be configured as any suitable pressure sensor, such as a diaphragm pressure sensor, a piston pressure sensor, and/or the like. In another embodiment, the sensor 114 may be configured as a load sensor, such as a load cell or a strain gauge. In such an embodiment, the sensor 114 may be configured to capture data indicative of the force or load acting on the feeder face plate 80, such as at the pivot joint 82. However, in alternative embodiments, the sensor 114 may be configured as any other suitable sensor or sensing device capable of capturing data indicative of a parameter associated with the force acting on the tilt actuator(s) 108.

In accordance with aspects of the present subject matter, the system 100 may include a computing system 116 communicatively coupled to one or more components of the agricultural harvester 10 to allow the operation of such components to be electronically or automatically controlled by the computing system 116. For instance, the computing system 116 may be communicatively coupled to the sensor 114 via a communicative link 118. As such, the computing system 116 may be configured to receive data from the sensor 114 indicative of the parameter associated with the force acting on the tilt actuator(s) 108 (e.g., the fluid pressure within the tilt actuator(s) 108). Moreover, the computing system 116 may be communicatively coupled to one or more valves 120 associated with the lift actuator(s) 102 of the harvester 10 via the communicative link 118. In this respect, the computing system 116 may be configured to control the operation of the valve(s) 120 to regulate the flow of fluid to the lift actuator(s) 102 such that the actuator(s) 102 raise and lower the header 34 relative to the field surface. Furthermore, the computing system 116 may be communicatively coupled to one or more valves 122 associated with the tilt actuator(s) 108 of the harvester 10 via the communicative link 118. In this respect, the computing system 116 may be configured to control the operation of the valve(s) 122 to regulate the flow of fluid to the tilt actuator(s) 108 such that the actuator(s) 108 adjust the fore/aft tilt angle of the header 34 relative to the field surface. Additionally, the computing system 116 may be communicatively coupled to any other suitable components of the agricultural harvester 10 via the communicative link 118, such as the engine 36, the transmission 34, and/or the like.

In general, the computing system 116 may comprise one or more processor-based devices, such as a given controller or computing device or any suitable combination of controllers or computing devices. Thus, in several embodiments, the computing system 116 may include one or more processor(s) 124 and associated memory device(s) 126 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 126 of the computing system 116 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 126 may generally be configured to store suitable computer-readable instructions that, when implemented by the processor(s) 124, configure the computing system 116 to perform various computer-implemented functions, such as one or more aspects of the methods and algorithms that will be described herein. In addition, the computing system 116 may also include various other suitable components, such as a communications circuit or module, one or more input/output channels, a data/control bus and/or the like.

The various functions of the computing system 116 may be performed by a single processor-based device or may be distributed across any number of processor-based devices, in which instance such devices may be considered to form part of the computing system 116. For instance, the functions of the computing system 116 may be distributed across multiple application-specific controllers or computing devices, such as a header controller (e.g., a header height controller and/or header tilt angle controller), a navigation controller, an engine controller, and/or the like.

Furthermore, in one embodiment, the system 100 may also include a user interface 128. More specifically, the user interface 128 may be configured to provide feedback (e.g., feedback indicating contact between the header 34 and the field surface) to the operator of the harvester 10. As such, the user interface 128 may include one or more feedback devices (not shown), such as display screens, speakers, warning lights, and/or the like, which are configured to provide feedback from the computing system 116 to the operator. The user interface 128 may, in turn, be communicatively coupled to the computing system 116 via the communicative link 118 to permit the feedback to be transmitted from the computing system 116 to the user interface 128. In addition, some embodiments of the user interface 128 may include one or more input devices (not shown), such as touchscreens, keypads, touchpads, knobs, buttons, sliders, switches, mice, microphones, and/or the like, which are configured to receive user inputs from the operator. In one embodiment, the user interface 128 may be mounted or otherwise positioned within the cab 30 of the harvester 10. However, in alternative embodiments, the user interface 128 may mounted at any other suitable location.

Referring now to FIG. 4, a flow diagram of one embodiment of a method 200 for controlling harvesting implement operation of an agricultural harvester is illustrated in accordance with aspects of the present subject matter. In general, the method 200 will be described herein with reference to the agricultural harvester 10 and the system 100 described above with reference to FIGS. 1-3. However, it should be appreciated by those of ordinary skill in the art that the disclosed method 200 may generally be implemented with any agricultural harvester having any suitable harvester configuration and/or within any system having any suitable system configuration. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 4, at (202), the method 200 may include receiving, with a computing system including one or more computing devices, sensor data indicative of a parameter associated with the force acting on a fluid-driven actuator of an agricultural harvester. As described above, the agricultural harvester 10 may include a sensor 114 configured to capture data indicative of a parameter associated with the force acting on the tilt actuator(s) 108, such as the pressure of the fluid within the tilt actuator(s) 108. Moreover, the sensor 114 may be communicatively coupled to the computing system 116 (e.g., via the communicative link 118). In this respect, as the harvester 10 travels across the field the perform a harvesting operation thereon, the computing system 116 may be configured to receive captured data from the sensor 114 (e.g., via the communicative link 118).

Additionally, at (204), the method 200 may include monitoring, with the computing system, the parameter associated with the force acting on the fluid-driven actuator relative to a predetermined minimum parameter value. Specifically, in several embodiments, the computing system 116 may be configured to process/analyze the received sensor data to determine or estimate the parameter associated with the force acting on the tilt actuator(s) 108. For example, as described above, in one embodiment, the received sensor data may be indicative of the pressure of the fluid within the tilt actuator(s) 108. In such an embodiment, the computing system 116 may be configured to process/analyze the received sensor data to determine or estimate the pressure of the fluid within the tilt actuator(s) 108. In this respect, the computing system 116 may include a suitable look-up table stored within its memory device(s) 126 that correlates the receive sensor data to the parameter values. Thereafter, the computing system 116 may be configured to monitor the determined parameter relative to a predetermined minimum parameter value.

Moreover, as shown in FIG. 4, at (206), the method 200 may include determining, with the computing system, that the harvesting implement has contacted a field surface of a field across which the agricultural harvester is traveling when the parameter falls below the predetermined minimum parameter value. More specifically, as the harvester 10 travels across the field, the header 34 of the harvester 10 may, in certain instances, contact the field surface (e.g., the field surface 50). Prolonged contact with the field surface may damage or accelerate the wear incurred by the header 54. When the header 34 contacts the field surface, the field surface supports a portion of the weight of the header 34, thereby causing the force acting on the tilt actuator(s) 108 to drop. For example, in such instances, the drop in the force acting on the tilt actuator(s) 108 may, in turn, cause the fluid pressure within the tilt actuator(s) 108 to drop. In this respect, when the monitored parameter (e.g., the pressure within the tilt actuator(s) 108) falls below the predetermined minimum parameter value, the computing system 100 may determine that the header 34 has contacted the field surface.

In one embodiment, at (206), the computing system 116 may determine that the header 34 has contacted the field surface when the parameter falls below the predetermined minimum parameter value for a predetermined time period. More specifically, in certain instances, momentary contact with the field surface (e.g., due to a bump in the field) may not damage the header 34. In this respect, after determining that the parameter has fallen below the predetermined minimum parameter value, the computing system 116 may be configured to monitor the time period across which such parameter remains below the predetermined minimum parameter value. Thereafter, when the monitored time period exceeds a predetermined minimum time period, the computing system 116 may be configured to determine that the header 34 has contacted the field surface.

The use of the force acting on the tilt actuator(s) 108 (e.g., the fluid pressure within the tilt actuator(s) 108) to determine when the header 34 has contacted the field surface may provide various technical advantages. For example, the moment of inertia of the header 34 when pivoting about the longitudinal axis 74 is much less than the moment of inertia of the header 34 when moving in the vertical direction 52. In this respect, the force acting on the tilt actuator(s) 108 (e.g., the fluid pressure within the tilt cylinder(s) 108) during operation of the harvester 10 is much less than the force acting on the lift actuator(s) 102 (e.g., the fluid pressure within the lift actuator(s) 102). As such, contact between the header 34 and the field surface may cause noticeable drops in the monitored parameter associated with the tilt actuator(s) 108 (e.g., fluid pressure within the tilt actuator(s) 108) that are not perceivable in the a similar parameter associated with the lift actuator(s) 102 (e.g., the fluid pressure within the lift actuator(s) 102). Thus, the use of the tilt actuator force (e.g. fluid pressure) may improve the accuracy of the determination that the header 34 has contacted the field surface by allowing the computing system 116 to detect contact between the header 34 and the field surface that would not be detectable based on the forces associated with (e.g., the fluid pressure within) the lift actuator(s) 102.

Furthermore, at (208), the method 200 may include initiating, with the computing system, a control action associated with lifting the harvesting implement off the field surface based on the determination that the harvesting implement has contacted the field surface. Specifically, when it is determined that the header 34 has contacted the field surface, the computing system 116 may be configured to initiate one or more control actions associated within lifting the header 34 relative to the field surface. For example, in one embodiment, in such instances, the computing system 116 may be configured to notify the operator of harvester 10. Specifically, in such an embodiment, the computing system 116 may be configured to transmit instructions to the user interface 128 (e.g., via the communicative link 118). The instructions may, in turn, instruct the user interface 128 to provide a visual or audible notification or indicator to the operator indicating that the header 34 has contacted the field surface. Thereafter, the operator may then choose to initiate any suitable corrective action he/she believes is necessary, such as adjusting the position of the header 34 relative to the field surface in the vertical direction 52 (e.g., by manually controlling the operation of the lift actuator valve(s) 120) and/or the fore/aft tilt angle 72 of the header 34 (e.g., by manually controlling the operation of the tilt actuator valve(s) 122).

In addition, at (208), in such instances, the computing system 116 may be configured to automatically adjust the position of the header 34 relative to the field surface in the vertical direction 52 and/or the fore/aft tilt angle 72 of the header 34. For example, in one embodiment, the computing system 116 may be configured to control the operation of the lift actuator valve(s) 120 in a manner that causes the lift actuator(s) 102 to raise the forward end 44 of the feeder housing 42, thereby lifting the header 34 relative to the field surface in the vertical direction 52. Moreover, in addition to or in lieu of controlling the lift actuator(s) 102, the computing system 116 may be configured to control the operation of the tilt actuator valve(s) 122 in a manner that causes the tilt actuator(s) 108 to adjust the position of the header 34 relative to the feeder housing 42. Such an adjustment may, in turn, change the fore/aft tilt angle 72 of the header 34 in a manner that lifts the header 34 off the field surface.

It is to be understood that the steps of the method 200 are performed by the computing system 116 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the computing system 116 described herein, such as the method 200, is implemented in software code or instructions which are tangibly stored on a tangible computer readable medium. The computing system 116 loads the software code or instructions via a direct interface with the computer readable medium or via a wired and/or wireless network. Upon loading and executing such software code or instructions by the computing system 116, the computing system 116 may perform any of the functionality of the computing system 116 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling harvesting implement operation of an agricultural harvester, the system comprising:
fluid-driven lift actuator configured to adjust a position of a harvesting implement of agricultural harvester relative to a field surface;
a fluid-driven tilt actuator configured to adjust the position of the harvesting implement relative to a feeder housing of the agricultural harvester;
sensor provided in operative association with the fluid-driven tilt actuator, the sensor configured to capture data indicative of a pressure of fluid within the fluid-driven tilt actuator; and
a computing system communicatively coupled to the sensor, wherein the computing system:
monitors the pressure of fluid within the fluid-driven tilt actuator relative to a predetermined minimum pressure value;
when the monitored pressure of fluid within the fluid-driven tilt actuator falls below the predetermined minimum pressure value, monitors a time period across which the monitored pressure is below the predetermined minimum pressure value;
compares the monitored time period to a predetermined minimum time period; and
when the monitored time period exceeds the predetermined minimum time period, determines that the harvesting implement has contacted a field surface of a field across which the agricultural harvester is traveling.

2. The system of claim 1, further comprising:
a feeder face plate pivotably coupled to the feeder housing, the fluid-driven tilt actuator coupled between the feeder face plate and the feeder housing such that the fluid-driven tilt actuator is configured to pivot the feeder face plate relative to the feeder housing.

3. The system of claim 2, wherein the feeder face plate is configured to be coupled to the harvesting implement.

4. The system of claim 1, wherein, when it is determined that the harvesting implement has contacted the field surface, the computing system is initiates a control action associated with lifting the harvesting implement relative to the field surface.

5. The system of claim 4, wherein the control action comprises controlling an operation of the fluid-driven lift actuator to raise the forward end of the feeder relative to the field surface.

6. The system of claim 4, wherein the control action comprises providing a notification to an operator of the agricultural harvester indicating that the harvesting implement has contacted the field surface.

7. An agricultural harvester, comprising:
a chassis;
a feeder housing pivotably coupled to the chassis;
a fluid-driven lift actuator coupled between the feeder housing and the chassis, the fluid-driven lift actuator configured to pivot the feeder housing relative to the chassis;
a feeder face plate adjustably coupled to the feeder housing;
a fluid-driven tilt actuator coupled between the feeder face plate and the feeder housing, the fluid-driven tilt actuator configured to pivot the feeder face plate relative to the feeder housing;
a sensor provided in operation association with the fluid-driven tilt actuator, the sensor configured to capture data indicative of a pressure of fluid within the fluid-driven tilt actuator; and
a computing system communicatively coupled to the sensor, wherein the computing system:
monitors the pressure of fluid within the fluid-driven tilt actuator relative to a predetermined minimum pressure value;
when the monitored pressure of fluid within the fluid-driven tilt actuator falls below the predetermined minimum pressure value, monitors a time period across which the monitored pressure is below the predetermined minimum pressure value;
compares the monitored time period to a predetermined minimum time period; and
when the monitored time period exceeds the predetermined minimum time period, determines that a harvesting implement of the agricultural harvester has contacted a field surface of a field across which the agricultural harvester is traveling.

8. The agricultural harvester of claim 7, wherein, when it is determined that the harvesting implement has contacted the field surface, the computing system initiates a control action associated with lifting the harvesting implement relative to the field surface.

9. The agricultural harvester of claim 8, wherein the harvesting implement is configured to be coupled to the feeder face plate.

10. The agricultural harvester of claim 7, wherein the control action comprises controlling an operation of the fluid-driven lift actuator to raise a forward end of the feeder housing relative to the chassis.

11. The agricultural harvester of claim 7, wherein the control action comprises providing a notification to an operator of the agricultural harvester indicating that the harvesting implement has contacted the field surface.

12. A method for controlling harvesting implement operation of an agricultural harvester, the agricultural harvester including a fluid-driven lift actuator configured to a position of a harvesting implement of the agricultural harvester relative to a field surface, the agricultural harvester further including a fluid-driven tilt actuator configured to adjust a position of the harvesting implement relative to a feeder housing of the agricultural harvester, the method comprising:
receiving, with a computing system including one or more computing devices, sensor data indicative of a pressure of fluid within the fluid-driven tilt actuator;

monitoring, with the computing system, the pressure of fluid within the fluid-driven tilt actuator relative to a predetermined minimum pressure value;

monitoring, with the computing system, a time period across which the monitored pressure is below the predetermined minimum parameter pressure value when the monitored pressure of fluid within the fluid-driven tilt actuator falls below the predetermined minimum pressure value;

comparing, with the computing system, the monitored time period to a predetermined minimum time period;

determining, with the computing system, that the harvesting implement has contacted a field surface of a field across which the agricultural harvester is traveling when the monitored time period exceeds the predetermined minimum time period; and initiating, with the computing system, a control action associated with lifting the harvesting implement off the field surface based on the determination that the harvesting implement has contacted the field surface.

13. The method of claim 12, wherein the control action comprises controlling an operation of the fluid-driven lift actuator to raise the forward end of the harvesting implement relative to the field surface.

\* \* \* \* \*